US010984062B2

(12) United States Patent
Bejjanki et al.

(10) Patent No.: US 10,984,062 B2
(45) Date of Patent: Apr. 20, 2021

(54) DEVICE AUGMENTATION OF REAL TIME COMMUNICATIONS

(71) Applicant: Citrix Systems, Inc., Fort Lauderdale, FL (US)

(72) Inventors: Santhosh Kumar Bejjanki, Parkland, FL (US); Sergii Shkrabak, Boca Raton, FL (US); Thomas John Sampieri, Boca Raton, FL (US); Dmytro Bozhko, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 101 days.

(21) Appl. No.: 16/291,596

(22) Filed: Mar. 4, 2019

(65) Prior Publication Data
US 2020/0218773 A1    Jul. 9, 2020

Related U.S. Application Data

(60) Provisional application No. 62/789,189, filed on Jan. 7, 2019.

(51) Int. Cl.
| | | |
|---|---|---|
| *G06F 16/955* | (2019.01) | |
| *H04N 7/15* | (2006.01) | |
| *G06K 19/06* | (2006.01) | |
| *H04L 12/18* | (2006.01) | |

(52) U.S. Cl.
CPC ... *G06F 16/9554* (2019.01); *G06K 19/06028* (2013.01); *H04N 7/15* (2013.01)

(58) Field of Classification Search
CPC ............ H04L 12/1818; H04L 12/1827; G06K 19/06028; H04N 7/15; G06F 16/9554

USPC ......................................................... 235/375
See application file for complete search history.

(56) References Cited

U.S. PATENT DOCUMENTS

| | | | |
|---|---|---|---|
| 8,966,477 B2 | 2/2015 | Cen et al. | |
| 9,667,703 B1 | 5/2017 | Vetter et al. | |
| 2010/0138780 A1 | 6/2010 | Marano et al. | |
| 2010/0299436 A1 | 11/2010 | Khalid et al. | |
| 2013/0057642 A1* | 3/2013 | Catchpole | H04N 7/15 348/14.08 |
| 2013/0212289 A1* | 8/2013 | Krishnakumar | H04L 12/1822 709/228 |
| 2014/0344420 A1 | 11/2014 | Rjeili et al. | |
| 2014/0344446 A1 | 11/2014 | Rjeili et al. | |
| 2016/0057135 A1 | 2/2016 | Jiang et al. | |

(Continued)

OTHER PUBLICATIONS

Apr. 24, 2020—International Search Report—PCT/US2020/012321.

*Primary Examiner* — Toan C Ly
(74) *Attorney, Agent, or Firm* — Banner & Witcoff, Ltd.

(57) ABSTRACT

Methods and systems for augmenting communications using input data from mobile devices are described herein. A computing device may establish a connection with a mobile device having one or more input devices. The computing device may display a barcode that, when scanned by a mobile device, causes the mobile device to access a web page. The web page may be configured to cause the mobile device to transmit, e.g., via a web browser executing on the mobile device and to the computing device, input data from the input devices. The input data may be used by the computing device to replicate a physical input device connected to the computing device. The computing device may transmit the input data to a different computing device.

20 Claims, 12 Drawing Sheets

(56) References Cited

U.S. PATENT DOCUMENTS

2016/0098365 A1 4/2016 Bshara et al.
2018/0302715 A1* 10/2018 Guo .................. H04W 4/02
2019/0026122 A1 1/2019 Wang et al.

* cited by examiner

DEVICE AUGMENTATION OF REAL TIME COMMUNICATIONS

CROSS-REFERENCE TO RELATED APPLICATIONS

This application claims priority to and incorporates by reference in its entirety U.S. provisional patent application Ser. No. 62/789,189, filed Jan. 7, 2019, and entitled DEVICE AUGMENTATION OF REAL TIME COMMUNICATIONS.

FIELD

Aspects described herein generally relate to computing devices, communications (e.g., video conferencing, audio conferencing), mobile devices, and the like.

BACKGROUND

Computer-implemented communications, such as video conferencing, audio conferencing, and the like, have become increasingly popular. Current communications technologies often rely on cameras and/or microphones to allow two or more users to communicate. For example, many conference rooms use a series of microphones around a table and a large centralized camera to facilitate communications amongst a group of users in the conference room and others in a communications conference. Communications may also require other input devices (and, in turn, other input data). For example, a real-time video game may require a game controller for users of different computing devices to provide input data.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Computing devices may have practical limitations regarding the number and scope of input devices that may be connected at any given time. For example, a computing device in a conference room may have a single camera and a single microphone for capturing video and audio from all participants in the conference room. While it may be desirable to connect a large number of cameras and microphones to the aforementioned computing device (e.g., a microphone for each participant in the conference room), practical limitations (e.g., the number of ports, available processing power, cost) may prevent doing so.

To overcome limitations in the prior art described above, and to overcome other limitations that will be apparent upon reading and understanding the present specification, aspects described herein are directed towards use of input data from a mobile device by a local computing device. A computing device may be configured with a virtual input device, which may be, e.g., software executing on the computing device which replicates a physical input device, such as a camera, microphone, or the like. The virtual input device may be configured to establish communications between a mobile device and the computing device over a network. Such communications may be established by causing the mobile device to, via a web browser executing on the mobile device, access a web page that causes the mobile device to transmit input data over a protocol and to the virtual input device of the computing device. The mobile device, in some examples, may be configured to transmit such input data from one or more input devices of the mobile device (e.g., a camera or microphone) to the virtual input device of the computing device. The input data may be, for example, a video stream from a camera of the mobile device, data from an accelerometer of the mobile device, an audio stream from a microphone of the mobile device, or the like. The computing device may use the input data from the mobile device for communications with a second computing device, such as use in a video and/or audio conference, video game, or the like, and thus additional, cumbersome accessories or peripheral components are no longer needed to be connected or otherwise installed to receive inputs and generate outputs to execute applications on the computing device. The computing device may receive multiple sets of input data (e.g., from multiple mobile devices and/or multiple input devices of the mobile device), and may be configured to combine such input data for transmission to a different computing device and/or output via, e.g., one or more output devices of the computing device, like a video shown on a display of the computing device.

For example, the computing device may be a desktop computer in a conference room, and the mobile device may be a smartphone or tablet associated with a user. A virtual input device application executing on the desktop computer may be configured to display a barcode on a display device of the desktop computer. The mobile device may, using a camera of the mobile device, detect the symbol and establish communications with the virtual input device application by, e.g., accessing a Uniform Resource Locator (URL) embedded in the symbol and associated with the virtual input device application. The mobile device may be configured to send, via a protocol such as the WebRTC protocol and/or using a web browser application of the mobile device, input data of the mobile device to the virtual input device application. The mobile device may thereby transmit input data to the desktop computer using software typically installed on the mobile device. The computing device may be configured to, using the virtual input device application, treat the input data as if it originated from a device physically connected to the computing device without the necessary cost of time and money to procure and install such additional, peripheral componentry.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards communications, such as video conferencing and audio conferencing, between computing devices. Such communications may entail the use of cameras, microphones, pointers (e.g., computer mice, touchscreens) and/or other input devices. Computing devices involved in such communications may be capable of communication with mobile devices, such as smartphones, laptops, and tablets, and, e.g., over a network. Such mobile devices may also have input devices, such as cameras, microphones, touchscreens, and the like.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled" and similar terms, is meant to include both direct and indirect mounting, connecting, coupling, positioning and engaging.

COMPUTING ARCHITECTURE

Figure 1:
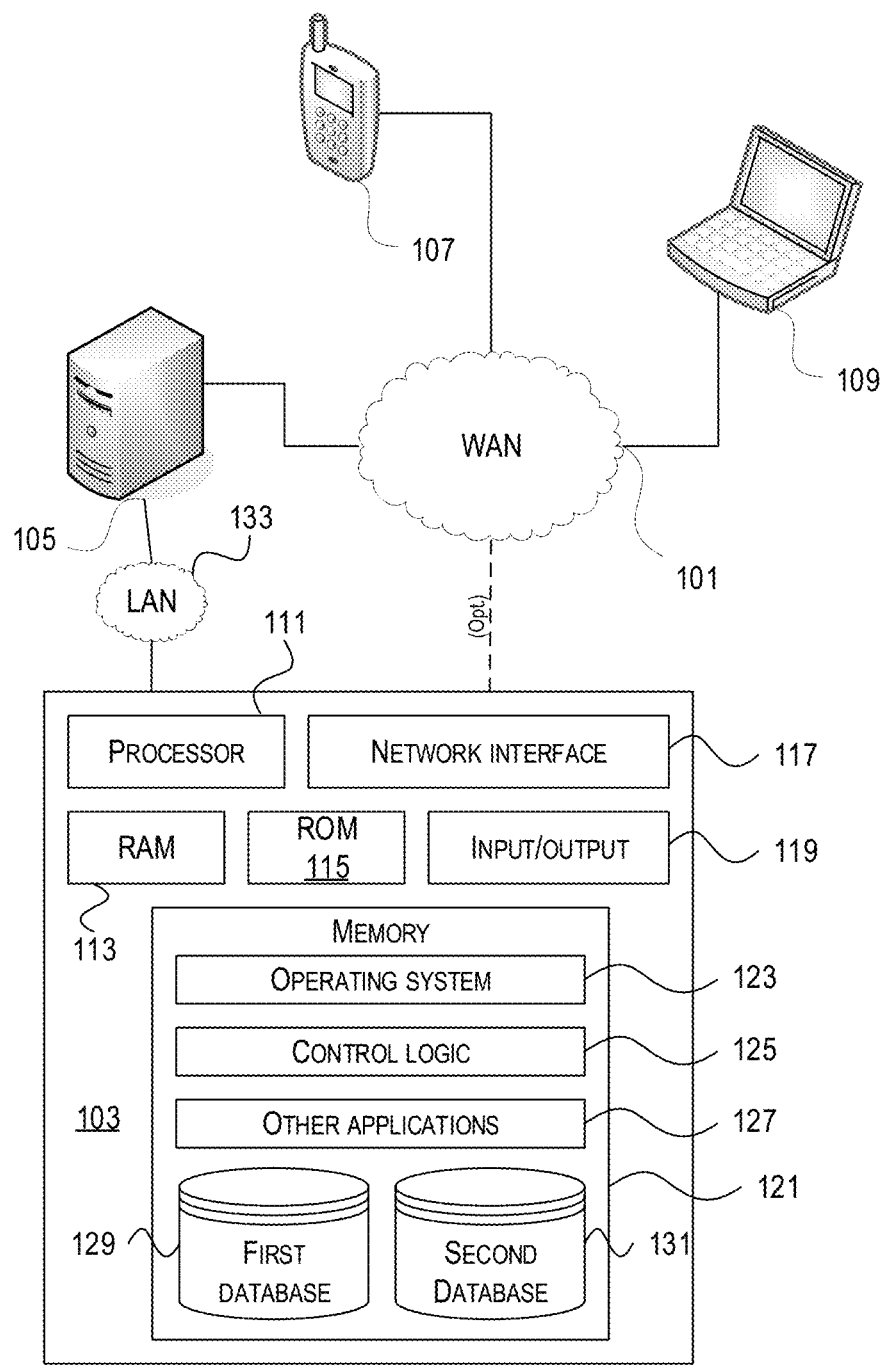
FIG. 1 depicts an example computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. The first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
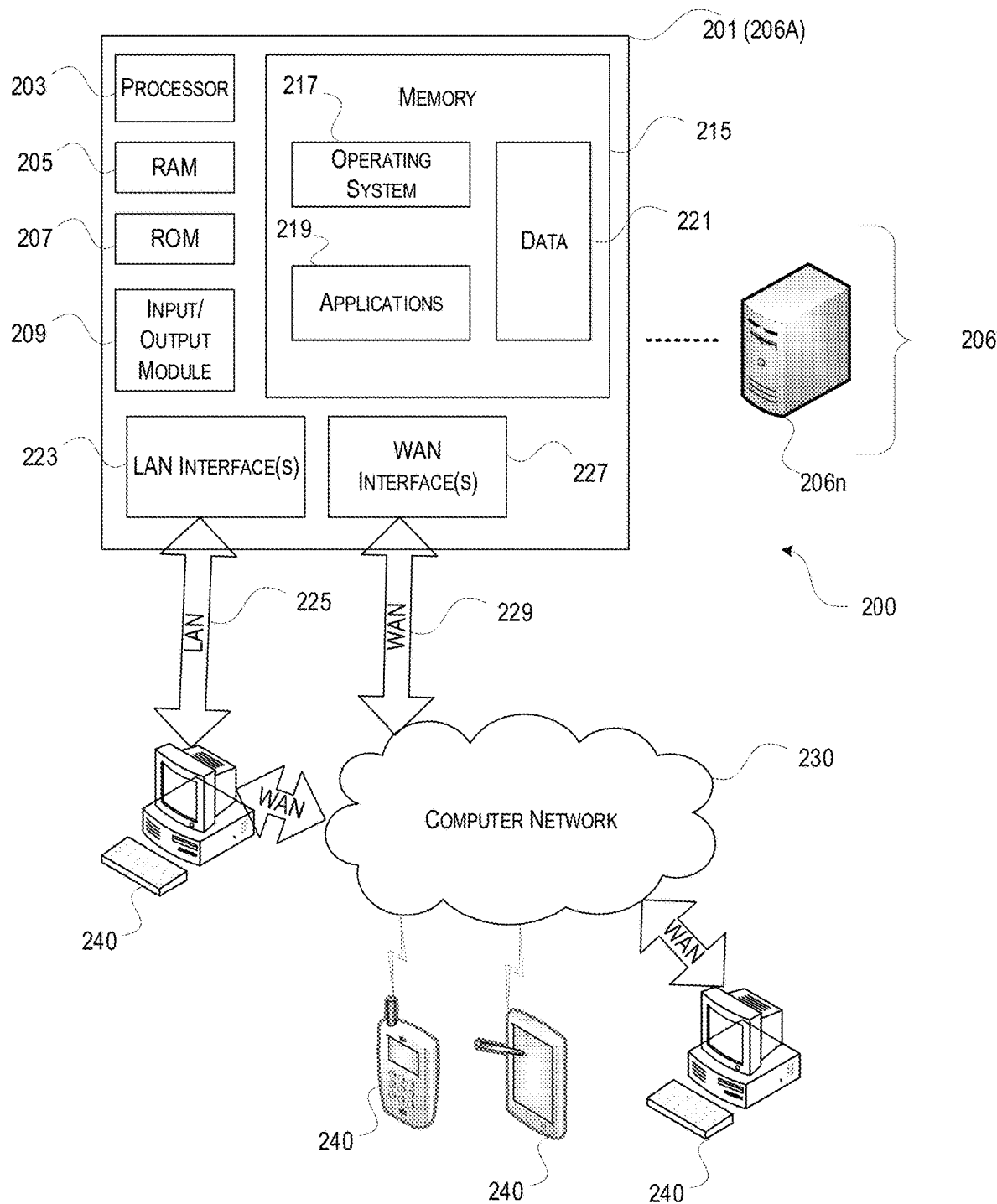
FIG. 2 depicts an example remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the computing device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). The computing environment 200 may include a network appliance installed between the server(s) 206 and client machine(s) 240. The network appliance may manage client/server connections, and in some cases can load balance client connections amongst a plurality of backend servers 206.

The client machine(s) 240 may be referred to as a single client machine 240 or a single group of client machines 240, while server(s) 206 may be referred to as a single server 206 or a single group of servers 206. A single client machine 240 may communicate with more than one server 206, and/or a single server 206 may communicate with more than one client machine 240. A single client machine 240 may communicate with a single server 206.

A client machine 240 may be referenced by any one of the following non-exhaustive terms: client machine(s); client(s); client computer(s); client device(s); client computing device(s); local machine; remote machine; client node(s); endpoint(s); or endpoint node(s). The server 206 may be referenced by any one of the following non-exhaustive terms: server(s), local machine; remote machine; server farm(s), or host computing device(s).

The client machine 240 may be a virtual machine. The virtual machine may be any virtual machine, and/or the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

A client device 240 may display application output generated by an application remotely executing on a server 206 or other remotely located machine. The client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206 may use a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 may communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. The server farm 206 may be administered as a single entity, and/or the server farm 206 may include multiple server farms.

A server farm may include servers 206 that execute a substantially similar type of operating system platform (e.g., WINDOWS, UNIX, LINUX, iOS, ANDROID, SYMBIAN, etc.) The server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

A first server 206a may receive requests from a client machine 240, forwards the request to a second server 206b (not shown), and responds to the request generated by the client machine 240 with a response from the second server 206b (not shown.) The first server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
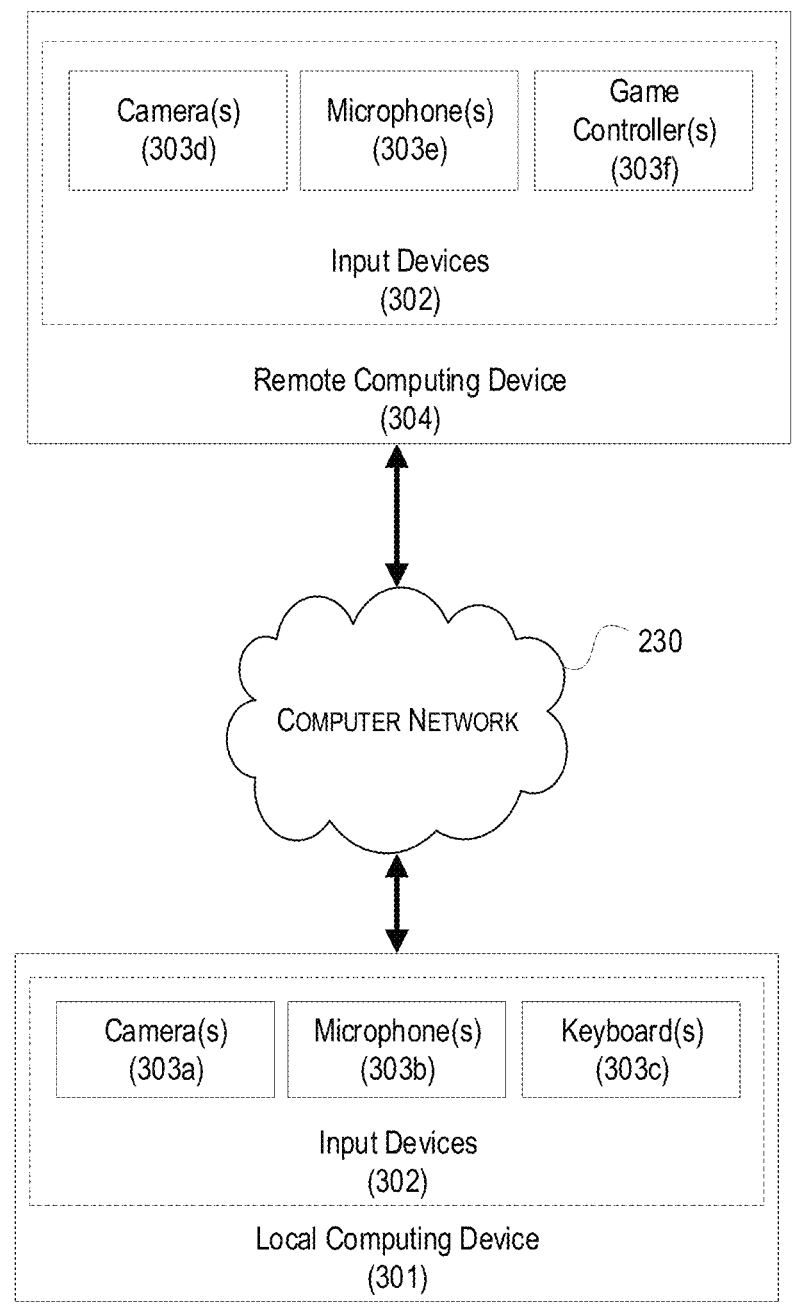
FIG. 3 shows an example communication session.

FIG. 3 shows an example communication session. Such a communication session may be, for example, a video call, an audio call, or the like, and may be in real-time. A local computing device 301 may communicate, via the computer network 230, with a remote computing device 304. The local computing device 301 and/or the remote computing device 304 may be the same as or similar to the computing device 201. The local computing device 301 and remote computing device 304 are distinguished as local and remote for illustration purposes and need not be located any particular distance from one another. The local computing device 301 and the remote computing device 304 may both have input devices 302. The input devices 302 for the local computing device 301 may comprise cameras 303a, microphones 303b, and/or keyboards 303c. The input devices 302 for the remote computing device 304 may comprise cameras 303d, microphones 303e, and/or game controllers 303f. The input devices 302 may comprise and/or be part of the I/O module 209.

Either or both the local computing device 301 and/or the remote computing device 304 may be configured to transmit input data from the input devices 302 to one another. For example, the local computing device 301 may transmit input data from the cameras 330a to the remote computing device 304, and the remote computing device may transmit input data from the microphones 303b to the local computing device 301. The local computing device 301 and/or the remote computing device 304 may be configured to use output devices (not shown), such as display devices, speakers, and the like, to output such input data to a user of the respective devices. For example, the local computing device 301 may display, on a display screen, an interface comprising video from the cameras 303d of the remote computing device 304, and may output, via speakers communicatively coupled to the local computing device 301, input data from the microphones 303e of the remote computing device 304 to the user of the local computing device 301. Input data transmitted via any computing devices, such as the local computing device 301 and/or the remote computing device 304, may be compressed, reformatted, and/or otherwise altered as desired. For example, the local computing device may compress and encode video from the cameras 303a before transmitting the video to the remote computing device 304.

The nature and quality of the communication session depicted in FIG. 3 may depend on which of the input devices 302 available to the remote computing device 304 and/or the local computing device 301. For example, the remote computing device 304 may be a desktop computer that may require that a webcam be plugged in to be capable of transmitting video to the local computing device 301. As another example, the microphones 303b of the local computing device 301 may be faulty, meaning that input data from the microphones 303b may have an excessively poor quality that may make communication difficult between users of the local computing device 301 and users of the remote computing device 304. As yet another example, many computing devices (including the local computing device 301 and/or the remote computing device 304) lack accelerometers, meaning that communications sessions involving such accelerometers (e.g., a real-time video game involving such accelerometers) may entail special, expensive devices be added to the local computing device 301 and/or the remote computing device 304.

COMMUNICATION AUGMENTATION

Figure 4:
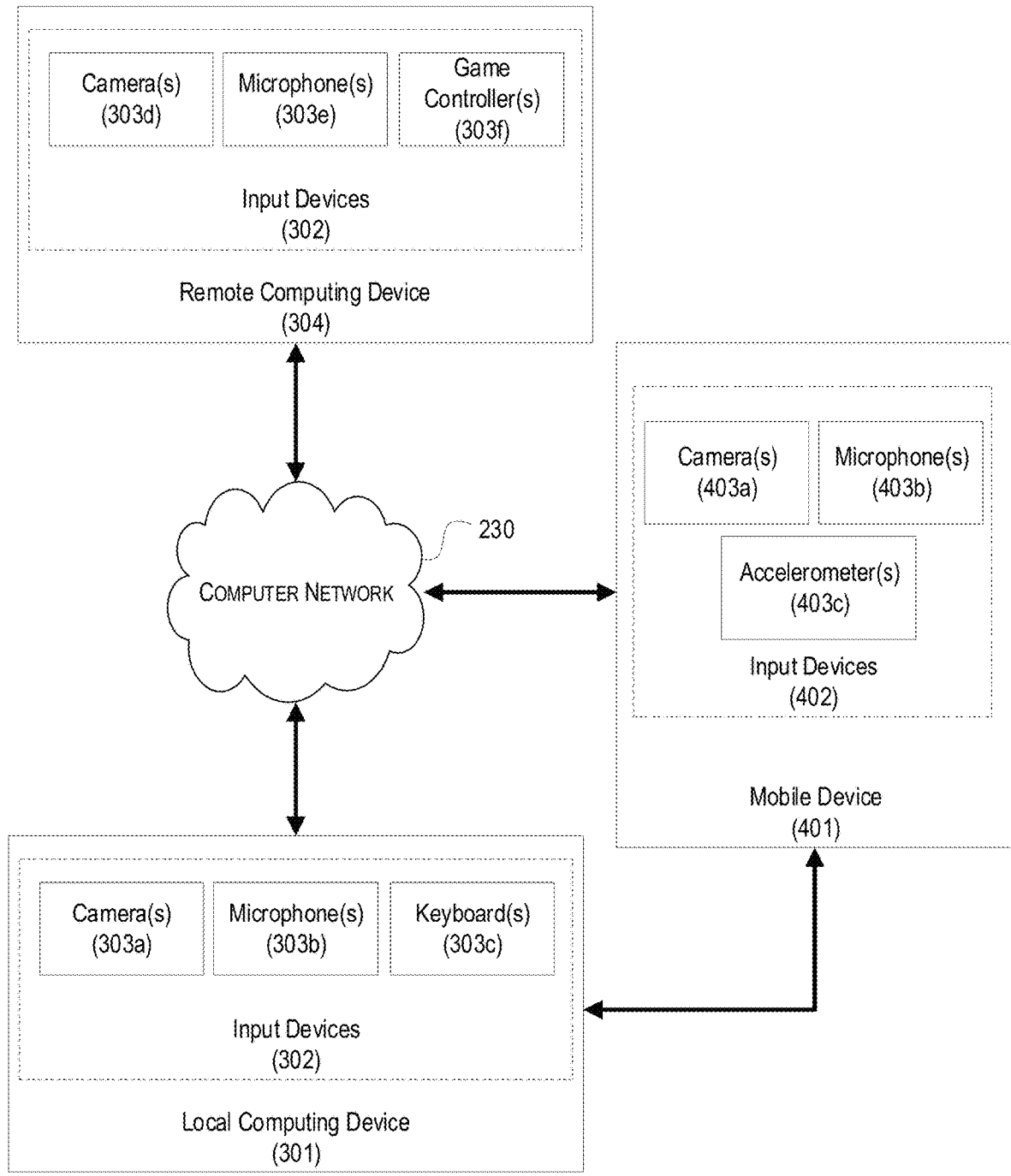
FIG. 4 shows an example communication session with a mobile device.

FIG. 4 shows an example communication session including a mobile device 401. The local computing device 301, the remote computing device 304, and the input devices 302 are the same. The mobile device 401 may be a smartphone, tablet, or other similar computing device, and/or may be the same as or similar to the computing device 201. The mobile device 401 may be communicatively connected, e.g., via the computer network 230, to the local computing device 301. Additionally and/or alternatively, the mobile device 401 may be directly connected (e.g., via a Universal Serial Bus (USB) cord) to the local computing device 301.

The mobile device 401 may have one or more input devices 402, such as cameras 403a, microphones 403b, and/or accelerometers 403c. The input devices 402 may be the same or similar to the input devices 302. The input devices 402 may be associated with an input device type, such as an audio device, video device, game controller, or the like. For example, if the mobile device 401 is a smartphone, it may have one or more cameras (e.g., a forward-facing camera and a rear-facing camera) and a microphone. The mobile device 401 may be configured to transmit input data from the input devices 402, e.g., over the computer network 230 and to the local computing device 301 and/or the remote computing device 304. For example, the mobile device 401 may be configured to establish an audio communications session with the local computing device 301, wherein the mobile device 401 transmits a user's voice as input data from the microphones 403b and to the local computing device 301. As another example, the mobile device 401 may be configured to transmit touch input and/or video data from the cameras 403a using a web browser executing on the mobile device.

The local computing device 301 may be configured to transmit input data from the mobile device 401 to the remote computing device 304. As will be described further below, the local computing device 301 may thereby use the input data from the mobile device 401 to replicate the presence of physical input devices connected For example, the mobile device 401 may transmit input data from the cameras 403a to the local computing device 301 over the computer network 230, and the local computing device 301 may transmit the input data to the remote computing device 304.

Figure 5:
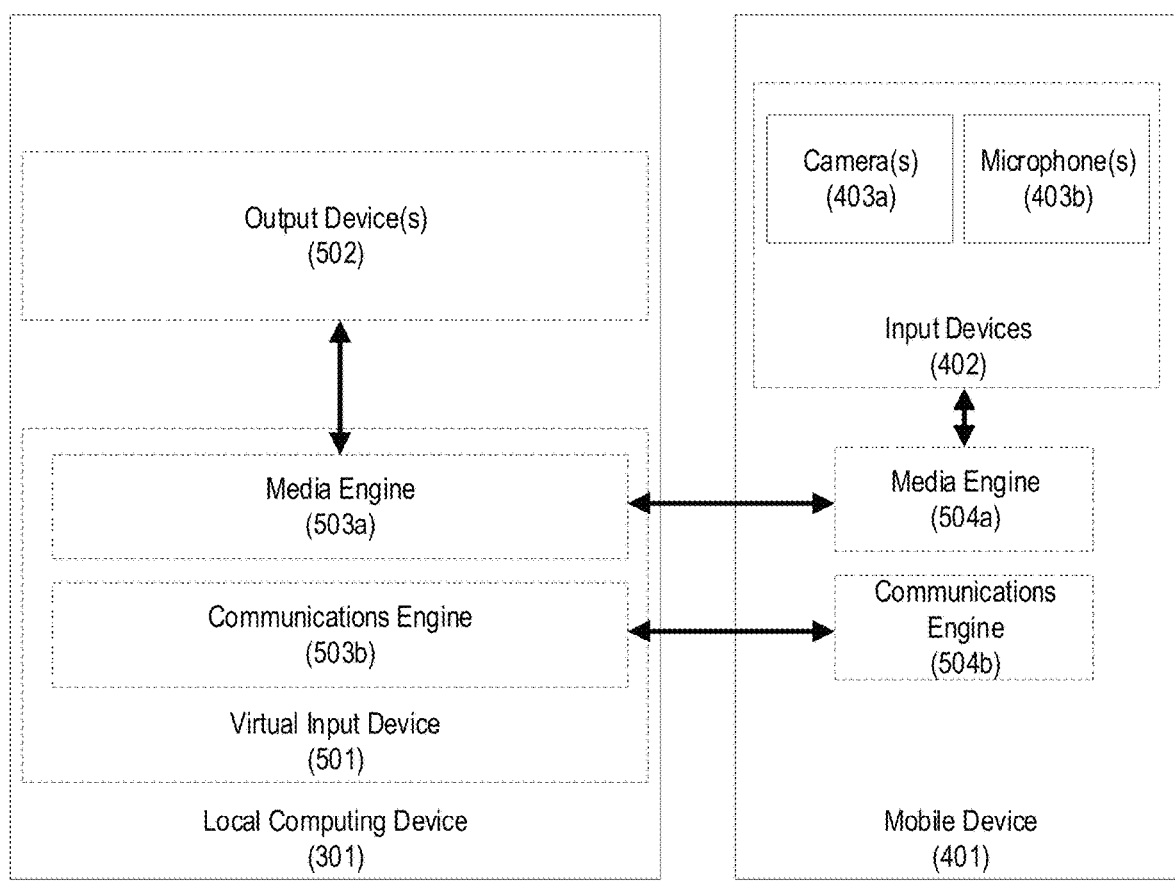
FIG. 5 shows an example communication session where input data from a mobile device flows to a local computing device.

FIG. 5 shows an example communication session where input data from the input devices 402 flows from the mobile device 401 to the local computing device 301. The local computing device 301 may be configured with a virtual input device 501. The virtual input device 501 may be software and/or hardware that may emulate the presence of input devices, such as the input devices 402. Such emulation may replicate a physical input device connected to the computing device. For example, such emulation may comprise providing the functionality of input devices connected to a computing device (e.g., input devices on the mobile device 401) on a different computing device (e.g., the local computing device 301). The virtual input device 501 may be part of a larger software suite (e.g., a video conference application) and/or may be a standalone piece of software (e.g., a driver or computer program). For example, the virtual input device 501 may be one or more drivers installed on an operating system of the local computing device 301 that replicates the presence of the cameras 403a and/or the microphones 403b. The virtual input device 501 may be configured to emulate one or more input devices based on the input devices 402. For example, the virtual input device 501 may determine which input devices the mobile device 401 has, and then emulate each input device by replicating the functionality of the input device on the local computing device 301 as if it were a physical input device directly connected to the local computing device. The virtual input device 501 may emulate multiple input devices simultaneously, such that, e.g., the virtual input device 501 may receive and/or transmit both video and audio (e.g., from the cameras 403a and the microphones 403b of the mobile device 401).

The virtual input device 501 may comprise a media engine 503a and a communications engine 503b. The communications engine 503b may be configured to establish communications with the mobile device 401, such as by establishing communications with a communications engine 504b of the mobile device 401, to prompt the mobile device to transmit input data from the input devices 402 to the local computing device 301. For example, the communications engine 503b may be configured to transmit, to the communications engine 504b, a URL for the mobile device 401 to access via a web browser executing on the mobile device 401. As another example, the communications engine 503b may be configured to authenticate the local computing device 301 with the mobile device 401, or vice versa. The communications engine 503b may comprise a Hypertext Transfer Protocol (HTTP) server configured to generate web pages corresponding to the virtual input device 501. For example, the communications engine 503b may be configured to generate a WebRTC protocol-compliant web page which may be accessed by the mobile device 401 to initiate transfer of input data from the mobile device 401 to the local computing device 301. The media engine 503a of the local computing device 301 may be configured to receive, from a media engine 504a of the mobile device 401, input data from the input devices 402. For example, the media engine 503a may comprise software configured to receive, and the media engine 504a may comprise software configured to send, input data using the WebRTC protocol.

The media engine 504a may be configured to process and/or format input data from the input devices 402 before sending such input data to the media engine 503a. Input data may be encoded and/or otherwise compressed for transmission to, e.g., conserve bandwidth or format the input data for output via the output devices 502. For example, the local computing device 301 may transmit, via the communications engine 503b and to the communications engine 504b, a request that input data comprising video be encoded using a particular video codec. As another example, based on a network (e.g., the computer network 230) having a limited quantity of bandwidth and/or a latency that exceeds a threshold, the media engine 504a may compress a input data from the input devices 402 for transmission to improve the transmission of the input data to the media engine 503a.

Input data received by the media engine 503a and from the media engine 504a may be provided to output devices 502 of the local computing device 301. The output devices 502 of the local computing device 301 may comprise display screens, speakers, or other devices configured for output. For example, the local computing device 301 may receive video data from the cameras 403a and via the media engine 504a and the media engine 503a, and may cause display of the video data on a display screen of the output devices 502. As another example, the local computing device 301 may receive audio data from the microphones 403b and via the media engine 504a and the media engine 503a, and may cause output of the audio data using one or more speakers of the output devices 502.

Input data received by the local computing device 301 may be formatted, arranged, and/or otherwise modified before being output via the output devices 502. For example, the local computing device 301 may display a plurality of video feeds, each corresponding to a different user in a video conference, and one of the video feeds may be a smaller, encoded version of input data received from the cameras 403a. As another example, input data from the microphones 403b, as sent from the media engine 504a to the media engine 503a, may be passed through one or more noise filters to reduce undesirable noise in an audio conference.

The communications engine 503b and the communications engine 504b may be configured to manage communications (e.g., the transmission of input data from the media engine 504a to the media engine 503a) between the local computing device 301 and the mobile device 401. For example, the communications engine 503b and the communications engine 504b may instantiate and/or manage sessions between the local computing device 301 and the mobile device 401. As another example, the communications engine 504b may transmit a list of each input device, of the input devices 402, to the communications engine 503b. As yet another example, the communications engine 503b may transmit, to the communications engine 504b, a request for audio and/or video input data. As an example from the perspective of a user of the communication application 601, the user might first use their smartphone (e.g., the mobile device 401) to scan a barcode displayed on a display screen of the local computing device 301. In response to scanning the barcode, the user's smartphone may navigate, using a web browser, to a web page (e.g., one executing on the local computing device) which initializes a WebRTC connection between the user's smartphone and the local computing device 301. This WebRTC connection may then allow the user to send video and/or audio from their smartphone to the local computing device 301. In this manner, the user's smartphone may establish communications with the local computing device 301 using a standard web browser, rather than a special application.

Figure 6:
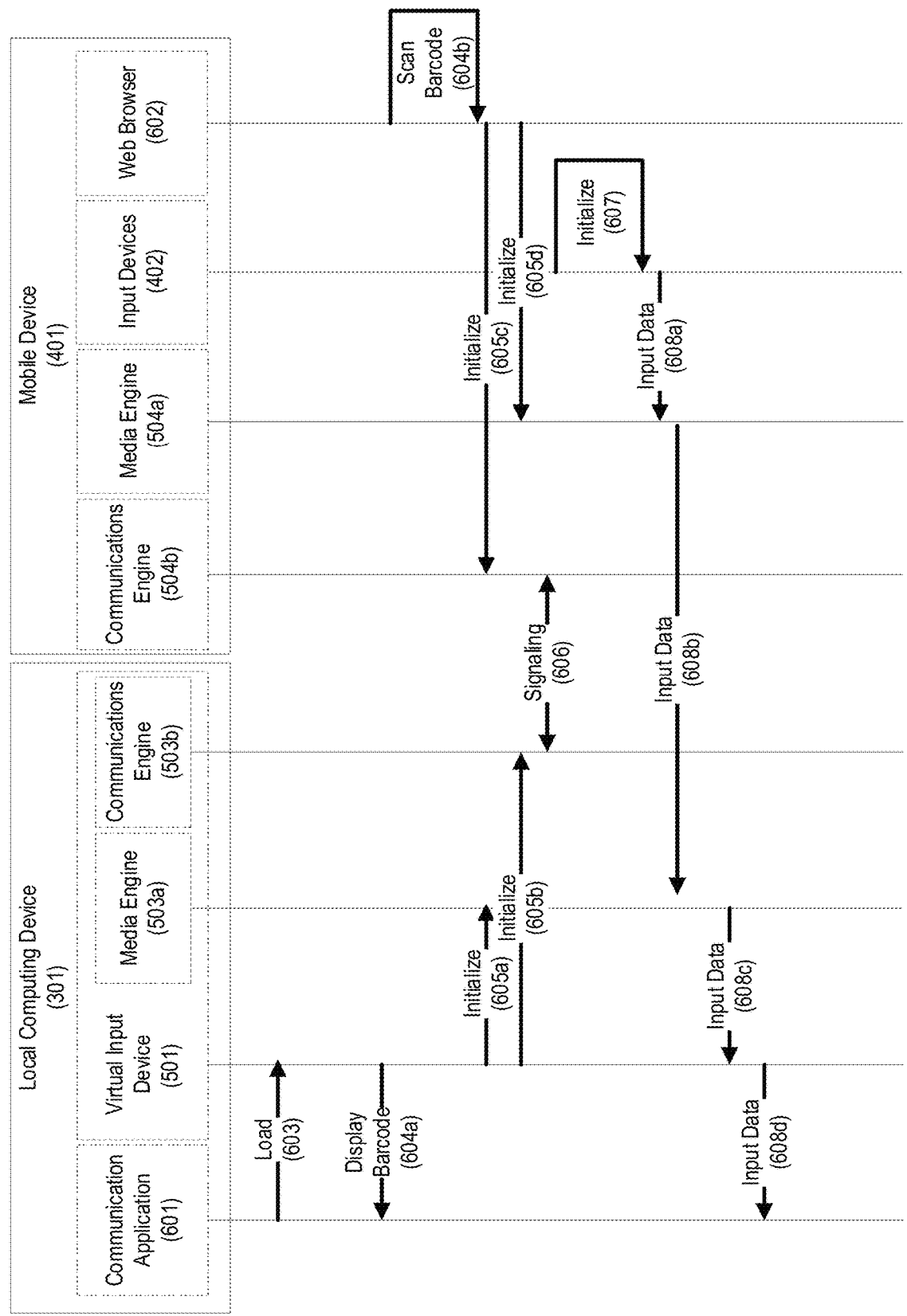
FIG. 6 shows a sequence diagram relating to a local computing device and a mobile device.

FIG. 6 shows a sequence diagram relating the local computing device 301 and the mobile device 401. The local computing device may execute a communication application 601 configured to effectuate communications, such as a video and/or audio conferencing application, a video game, or the like. The mobile device 401 may be configured with an application, such as a web browser 602. Though FIG. 6 shows arrows between elements of the local computing device 301 and/or the mobile device 401, no particular format or data need be transmitted between such elements.

In step 603, the communication application 601 may load the virtual input device 501. The virtual input device 501 may be loaded such that it emulates an input device connected to the local computing device. Loading the virtual input device 501 may comprise causing the virtual input device 501 to be presented in an operating system of and/or in software executing on the local computing device 301 as an input device. Loading the virtual input device 501 may comprise registering the input devices 402 in an operating system and/or with software executing on the local computing device 301. Loading the virtual input device 501 may comprise determining one or more input devices, of the input devices 402, to emulate on the local computing device 301. For example, the local computing device 301 may query the mobile device 401 for a list of the input devices 402 and, based on that list, may emulate one or more input devices at the local computing device 301.

Loading the virtual input device 501 may comprise initializing the media engine 503a and/or the communications engine 503b. Initialization of the media engine 503a and/or the communications engine 503b may comprise displaying, in an operating system of the virtual input device 501, one or more emulated input devices. Initialization of the media engine 503a and/or the communications engine 503b may be caused by one or more applications executing on the local computing device 301. For example, executing a conference call application in the local computing device 301 may cause initialization of the media engine 503a and/or the communications engine 503b.

In step 604a, the virtual input device 501 may cause display of a barcode via the communication application 601. The barcode may be displayed via a display device, which may be part of the output devices 502. The barcode may be a one- or two-dimensional barcode, such as a Quick Response (QR) code by the Denso Wave Corporation of Chita, Japan. The barcode may comprise information such as a unique URL or identifier of the virtual input device 501 and/or the local computing device 301. For example, the virtual input device 501 may instantiate a HTTP server on the local computing device 301 at a particular URL and/or Internet Protocol (IP) address, cause display of a web page corresponding to the virtual input device 501 via the HTTP server, and cause display of a barcode comprising the particular URL and/or IP address. Though step 604a is described with respect to a barcode, other indications of the virtual input device 501 and/or the local computing device 301 may be displayed. For example, a shortened URL associated with the virtual input device 501 may be displayed. As another example, an IP address associated with the local computing device 301 may be displayed.

In step 604b, the mobile device 401 may, using the web browser 602, scan the barcode displayed in step 604a using, e.g., the cameras 403a. Use of such a barcode by the local computing device 301 and the mobile device 401 may advantageously avoid the need for a user of the mobile device 401 to manually type in such detail. Additionally or alternatively, steps 604a and 604b may be skipped, and the user may be prompted to enter a unique identifier of the virtual input device 501 and/or the local computing device 301 (e.g., the user may be manually prompted to enter a URL corresponding to the virtual input device 501 and/or the local computing device 301 into the web browser 602).

In step 605a, the virtual input device 501 initializes the media engine 503a. In step 605b, the virtual input device 501 initializes the communications engine 503b. In step 605c, the web browser 602 initializes the communications engine 504b. In step 605d, the web browser 602 initializes the media engine 504a. The particular ordering of step 605a, step 605b, step 605c, and step 605d need not be in the order shown in FIG. 6. For example, the media engine 503a may be initialized first, last, or in any relation to the media engine 504a. Initialization may comprise configuring the media engine 503a, the communications engine 503b, the media engine 504a, and/or the communications engine 504b with information about the local computing device 301 and/or the mobile device 401. Initialization may comprise configuring the media engine 503a, the communications engine 503b, the media engine 504a, and/or the communications engine 504b with information about the input devices 402, such as an identity of one or more of the input devices 402.

Initialization of the media engine 504a and/or the communications engine 504b may be based on a web page accessed by the web browser 602 and based on the barcode scanned in step 604b. The virtual input device 501 may cause, via the barcode, the mobile device 401 to access a web page which causes it to initialize the media engine 504a and/or the communications engine 504b. Initialization of the media engine 504a and/or the media engine 503a may be performed using a programming language such as JAVASCRIPT and/or WebRTC, whereas initialization of the communications engine 504b and/or the communications engine 503b may comprise use of websockets. Initialization of the media engine 504a and/or the communications engine 504b may thereby be performed using the web browser 602 of the mobile device 401, such that it may access a web page to perform steps and need not comprise specially-installed software. The web page accessed by the mobile device 401 may be hosted by the local computing device 301, e.g., via HTTP server software. As such, the barcode displayed by the local computing device in step 604a may correspond to a URL and/or IP address of the local computing device 301, and that URL and/or IP address may itself correspond to a web page causing the mobile device 401 to initialize the media engine 504a and/or the communications engine 504b.

In step 606, signaling may be performed between the communications engine 503b and the communications engine 504b. Signaling may comprise exchanging information about the input devices 402, the virtual input device 501, the local computing device 301, and/or the mobile device 401. Such information may comprise, for example, an indication that input data is available. For example, the local computing device 301 may authenticate with the mobile device 401 and determine one or more input devices, of the input devices 402, to receive and emulate via the virtual input device 501. As another example, the local computing device 301 may transmit, to the mobile device 401, an indication that the communication application 601 has ceased execution and no more input data is needed from the input devices 402. Such signaling may comprise exchanging protocol data, e.g., via the Session Description Protocol (SDP).

In step 607, one or more of the input devices 402 may be initialized. Initialization may comprise any steps to activate or otherwise begin receiving input data from the one or more of the input devices 402. For example, initialization may comprise activating the cameras 403 and/or the microphones 403b and beginning to receive a stream of input data from such input devices. Initialization may comprise any steps required by an operating system executing on the mobile device 401 to receive input data from the input devices 402. For example, if the mobile device 401 is a smartphone with security features, a user of the mobile device 401 may be required to manually approve access, by the web browser 602, to the cameras 403.

In step 608a, step 608b, step 608c, and step 608d, input data may be sent in a stream from the input devices 402 of the mobile device 401 to the communication application 601 of the local computing device 301. In step 608a, the input data may be sent from the input devices 402 to the media engine 504a. In step 608b, the input data may be sent from the media engine 504a of the mobile device 401 to the media engine 503a of the local computing device 301. In step 608c, the input data may be sent from the media engine 503a to the virtual input device 501. In step 608d, the virtual input device 501 may send the input data to the communication application 601. The communication application 601 may thereby treat the input data as if it originated from an input device physically connected to the local computing device 301. In this manner, applications executing on the local computing device 301 need not be specially configured to retrieve input data from the mobile device 401.

Figure 7:
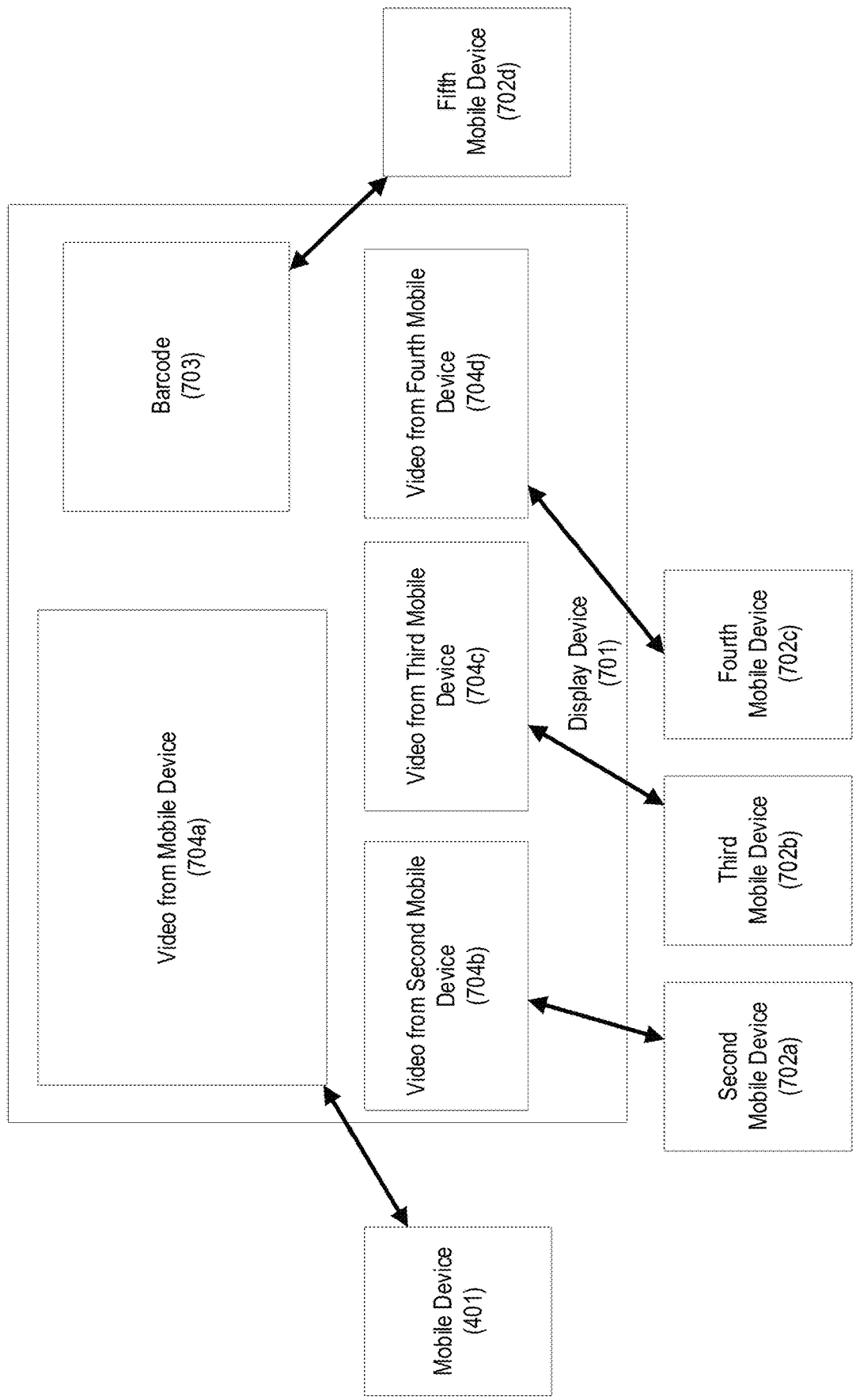
FIG. 7 shows a display device executing on a local computing device and showing a video conference call.

FIG. 7 illustrates a display device 701 showing a video conference call. The display device 701 may be configured to allow multiple users in the same room to access the communication application 601 to establish communications with another computing device (e.g., remote computing device 304), as described in more detail below. The display device 701 may be part of the output devices 502 of the local computing device 301. The display device 701 may display output of the communication application 601. Based on the steps depicted in FIG. 6, video from the mobile device 401 is shown as video from the mobile device 704a on the display device 701. A second mobile device 702a, a third mobile device 702b, and a fourth mobile device 702c are also shown and, in turn, video from the second mobile device 704b, video from the third mobile device 704c, and video from the fourth mobile device 704d are shown on the display device 701. A fifth mobile device 702d may be capable of connecting to the communication application 601, but may not yet be connected to the communication application 601. A barcode 703 is also shown on the display device 701, and the barcode 703 may be scanned by the fifth mobile device 702d to perform steps similar to those shown in FIG. 6 to transmit input data (e.g., camera data from the fifth mobile device 702d) to the local computing device 301 for display on the display device 701. That input data is not yet but may be shown on the display device 701 along with the video from the mobile device 704a, the video from the second mobile device 704b, the video from the third mobile device 704c, and the video from the fourth mobile device 704d.

The display device 701 may be configured to allow multiple users in the same room to access the communication application 601 without connecting and/or configuring additional equipment (e.g., to the local computing device 301). For example, if the communication application 601 is a video game, placement of the barcode on the display device 701 along with video streams of existing players (e.g., the video from the mobile device 704a) may advantageously allow users to add themselves to the communication application 601 without disrupting activity by other users and without requiring that additional input devices be directly plugged into the computing device executing the communication application 601. As another example, the communication application 601 may be an online conference application which may allow on-the-fly meetings wherein attendees may join (e.g., using their smartphones) without connecting additional microphones and/or cameras to the computing device executing the communication application 601.

Figure 8:
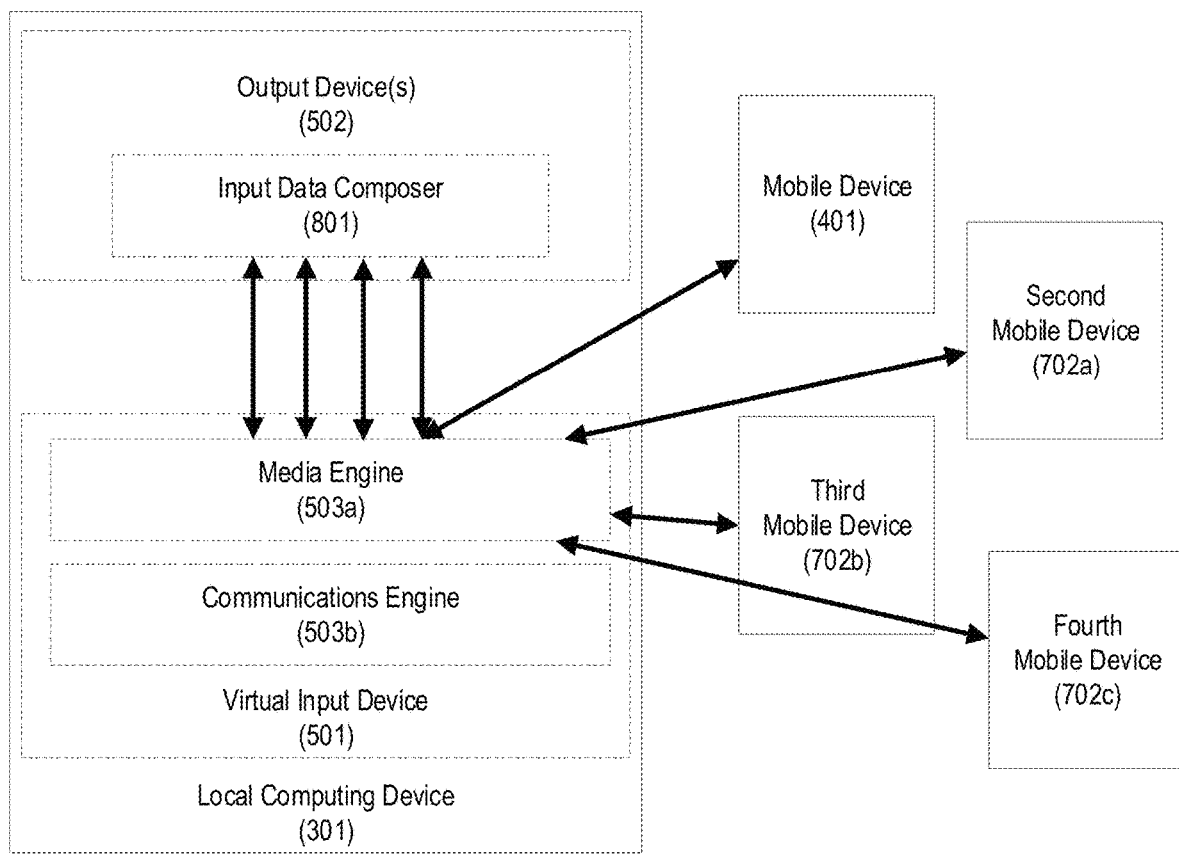
FIG. 8 shows a video conference call with multiple mobile devices connecting to a local computing device.

FIG. 8 shows a video conference call with multiple mobile devices connecting to the local computing device 301. The video conference call depicted in FIG. 8 may be the same as or similar to that shown in FIG. 7 such that, for example, the mobile device 401, the second mobile device 702*a*, the third mobile device 702*b*, and the fourth mobile device 702*c* may be the same as those shown in FIG. 7. Multiple mobile devices, such as the mobile device 401, the second mobile device 702*a*, the third mobile device 702*b*, and the fourth mobile device 702*c*, may connect to the media engine 503*a* of the virtual input device 501 of the local computing device 301. For instance, the media engine 503*a* may maintain a plurality of peer connections, each associated with a different mobile device, and thereby simultaneously receive input data from a plurality of different mobile devices.

An input data composer 801 is shown as part of the output devices 502 of the local computing device 301. The input data composer 801 may be configured to collect multiple sets of input data (e.g., multiple video streams from different mobile devices) and combine it for presentation and/or output via the output devices 502. For example, the input data composer 801 may be configured to collect multiple video streams and arrange them such that all may be viewed simultaneously for a conference call, such as in the manner shown in FIG. 7. As a particular example, the input data composer 801 may receive multiple input streams comprising video, divide available space on the display device 701 by the number of input streams, and display each input stream on a different portion of the display device 701. As another example, the input data composer 801 may be configured to, based on audio from one mobile device indicating speech, lower the volume of (but still output) audio from other mobile devices. For example, the input data composer 801 may receive a plurality of sets of input data comprising audio (e.g., spoken voice audio) and modify the gain of each respective set of input data to ensure that all audio is approximately the same volume when output simultaneously. In this manner, the input data composer 801 and/or the plurality of peer connections at the media engine 503*a* may facilitate receipt and output of multiple sets of input data, such that a single computing device (e.g., the local computing device 301) may present and/or output multiple video streams, audio streams, or other similar input data at the same time.

Figure 9:
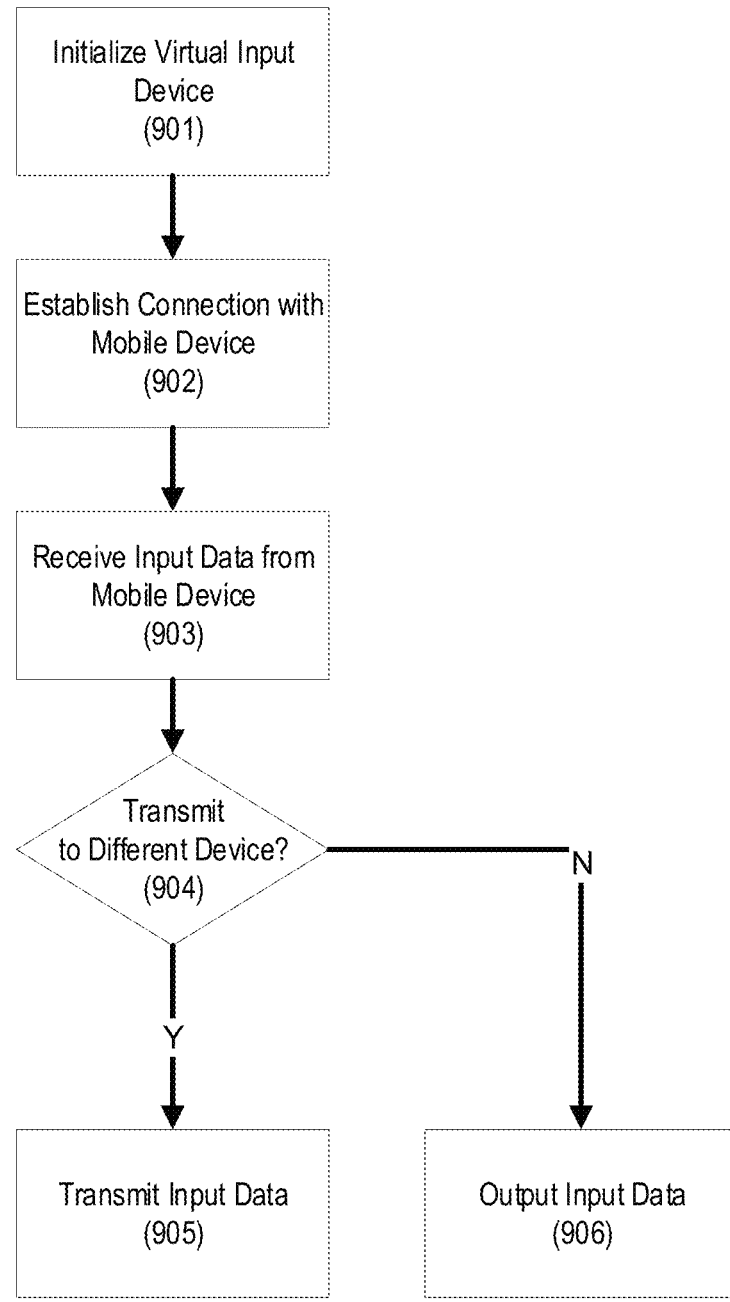
FIG. 9 is a flow chart with steps that may be performed by a local computing device with respect to a mobile device.

FIG. 9 is an example flow chart which may be performed by the local computing device 301. In step 901, a virtual input device, such as the virtual input device 501, may be initialized. Initialization may comprise running an executable program or software associated with the virtual input device and/or causing the virtual input device 501 to become available to the local computing device 301. The initialization may cause the virtual input device 501 to emulate the presence of one or more input devices.

In step 902, a connection may be established with one or more mobile devices, such as the mobile device 401 and/or the mobile devices 702*a*-702*d*. The connection may be made over a network, such as the computer network 230. The connection may be established via the virtual input device 501, and/or may be established via a protocol such as WebRTC. The connection may comprise one or more messages which authenticate and/or encrypt communications between the local computing device 301 and the mobile device(s). The connection may be established via the communications engine 504*b* and/or the communications engine 503*b*. Establishing the connection may comprise initializing a web page (e.g., by executing an HTTP server and making the web page available) associated with the virtual input device 501. Establishing the connection may comprise generating and/or displaying an indication of the location of the web page (e.g., a barcode comprising a URL associated with the web page).

In step 903, input data may be received from the mobile device(s). The input data may be received via the input devices 402, transmitted via the media engine 504*a* and/or received by the media engine 503*a*, and/or output by the output devices 502. The input data may be processed and/or formatted (e.g., by the media engine 504*a*) when received by the media engine 503*a*, and/or may be received and formatted by the media engine 504*a*. The formatting of the input data may be based on the intended use of the input data: for example, if the input data comprises video data which will be used by a video conference application, the video data may be encoded using a codec which may be used by the video conference application. The input data may be in a protocol different from that used to establish the connection in step 902. For example, the connection established in step 902 may be via an HTTP connection, whereas the input data may be transmitted via WebRTC, such that protocols readily available on a typical web browser of a mobile device may be used. The input data may be received via a web browser executing on the mobile device(s). As multiple different mobile devices may be connected to the virtual input device 501, the virtual input device 501 may be configured to receive and segregate input data based on which mobile device, of the mobile devices, it receives the input data from. For example, the media engine 504*a* of the mobile device 401 may insert information in input data generated by the input devices which uniquely identifies the mobile device 401. Additionally and/or alternatively, the media engine 503*a* may tag received input data based on a session associated with the input data as established by the communications engine 503*b*.

In step 904, it may be decided whether the input data received should be transmitted to a different computing device. The computing device executing the virtual input device may itself output received input data (e.g., on a display device connected to the computing device), and/or may transmit the input data to a different computing device (e.g., over a network to a server executing a communications application). If the answer is yes, the input data may be transmitted (e.g., to a different computing device, such as the remote computing device 304, and over the computer network 230) in step 905. For example, the input data may be transmitted to a remote server executing a conference call application, such that the input data may be used by the conference call application. Otherwise, in step 906, the input data may be output (e.g., using the output devices 502). For example, the computing device receiving the input data may itself be executing a conference call application, such that the received input data may be output by the computing device without further transmission.

Figure 10:
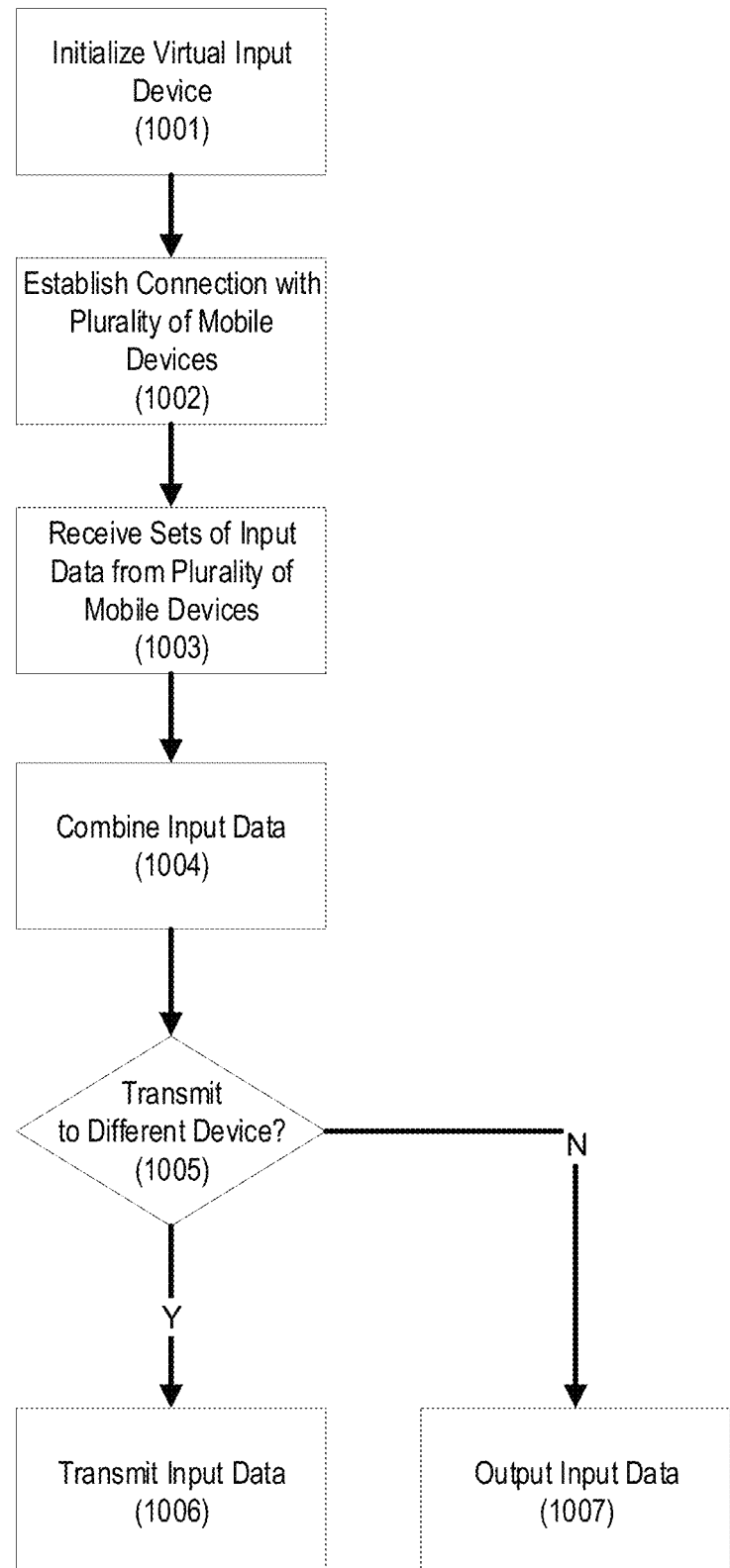
FIG. 10 is a flow chart with steps that may be performed by a local computing device with respect to a plurality of mobile devices.

FIG. 10 is an example flow chart which may be performed by the local computing device 301 and with respect to multiple mobile devices. Step 1001 may be the same as or similar to step 901. Step 1002 may be the same as or similar to step 902, and in step 1001 the local computing device 301 may establish a connection with a plurality of different mobile devices. For example, the mobile devices may be the mobile device 401 and/or the mobile devices 702a-702d, such as in a conference room. In step 1003, which may be the same as or similar to step 903, multiple sets of input data may be received from the different mobile devices. In step 1004, the multiple sets of input data received in step 1003 may be combined. Combining the multiple sets of input data may comprise combining audio and/or video of the input data into a single output stream, e.g., by the input data composer 801. For example, multiple video streams may be arranged on an output display such that a single video stream is displayed with each of the multiple video streams comprising a different portion of the single video stream. As another example, multiple audio streams may be combined into a single audio stream for output by a speaker. In step 1005, step 1006, and step 1007, which may be the same as or similar to step 904, step 905, and step 906, the combined input data may be transmitted to a different computing device and/or output.

Figure 11:
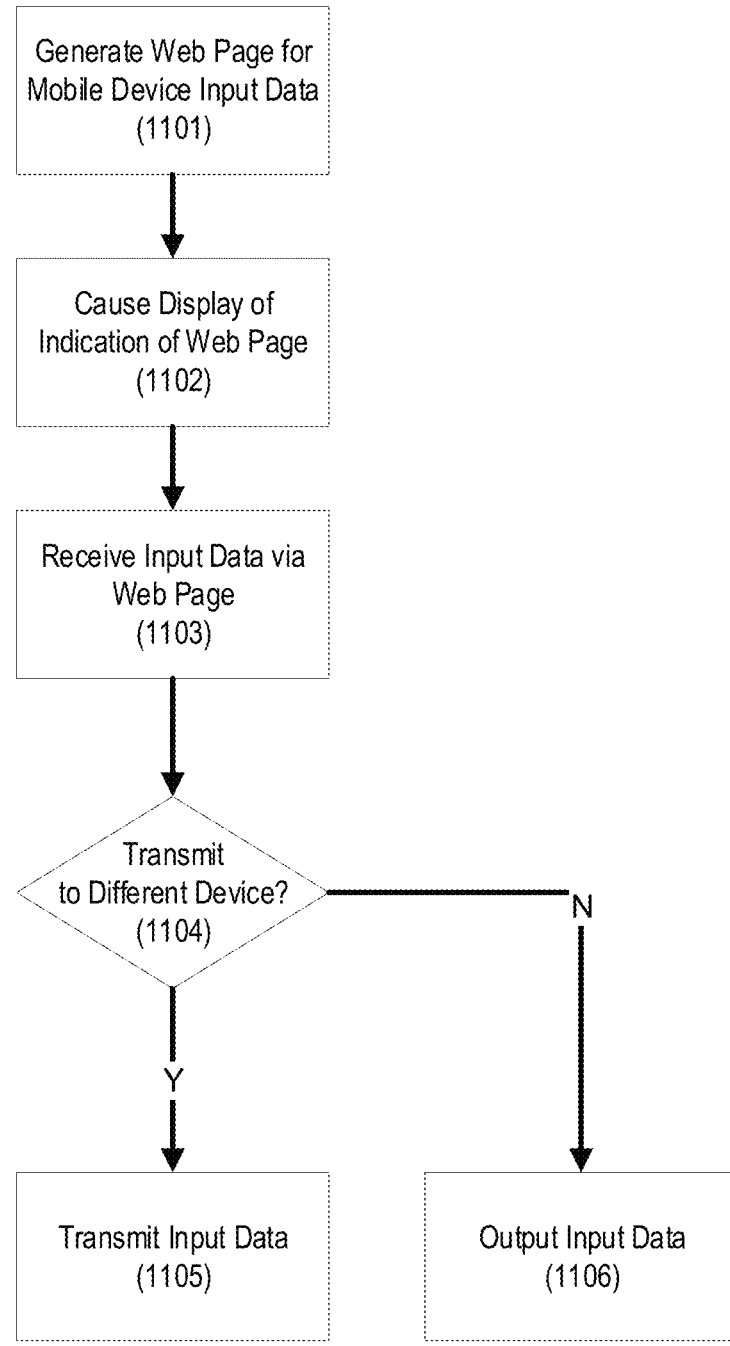
FIG. 11 is a flow chart with steps that may be performed by a local computing device and with respect to a web page.

FIG. 11 is a flow chart which may be performed by a local computing device, such as the local computing device 301. In step 1101, the local computing device may generate a web page which may be configured to receive input data from a mobile device, such as the mobile device 401 and/or the mobile devices 702a-702d. Generation of a web page may comprise executing a server (e.g., an HTTP server) which may be accessed by one or more mobile devices using, e.g., a web browser executing on the mobile devices. The web page may comprise code which causes mobile devices to transmit input data via, e.g., the WebRTC protocol.

In step 1102, the local computing device may cause display of an indication of the web page. The indication may be, for example, a barcode comprising a URL and/or other identifier of the web page, such that a mobile device may use the barcode to locate the web page. Such a barcode may be one-dimensional, two-dimensional, or the like. Additionally and/or alternatively, the indication may be a shortened URL and/or IP address associated with the web page.

In step 1103, the local computing device may receive, via the web page and from the mobile device, input data. Step 1103 may be the same as or similar to steps 903 and/or 1003. The input data may be received via the media engine 503a and/or the media engine 504a. The input data may be received via a protocol such as WebRTC, such that the local computing device may receive input data via a web browser executing on a mobile device. In step 1104, step 1105, and step 1106, which may be the same as or similar to step 904, step 905, and/or step 906, and/or step 1005, step 1006, and/or step 1007, the input data may be transmitted to a different computing device and/or output.

Figure 12:
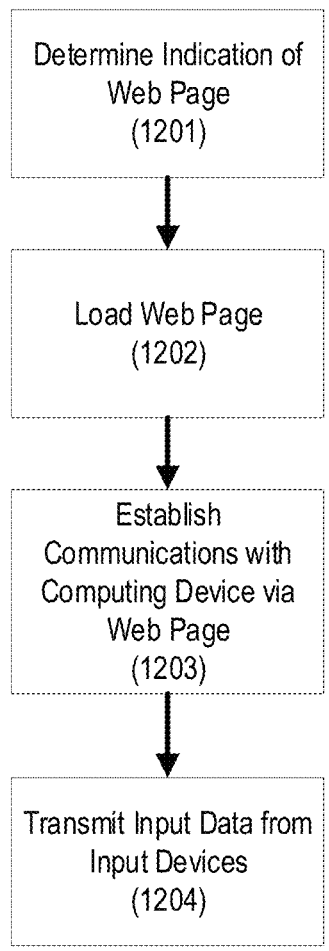
FIG. 12 is a flow chart with steps that may be performed by a mobile device and with respect to a web page.

FIG. 12 is a flow chart which may be performed by a mobile device, such as the mobile device 401. In step 1201, the mobile device may determine an indication of a web page. Determining the indication of the web page may comprise receiving a URL of the web page or IP address associated with the web page by, e.g., a user manually entering the URL and/or IP address into the mobile device using an input device, and/or by scanning a barcode comprising the URL and/or IP address.

In step 1202, the mobile device may load the web page, and in step 1203, the mobile device may establish communications with a computing device and via the web page. Loading the web page may comprise loading the web page in a web browser executing on the mobile device. The web page may comprise code (e.g., WebRTC commands, a programming language such as JAVASCRIPT, or the like) which may execute via the web browser executing on the mobile device. Using the web page (e.g., code on the web page), the mobile device may establish communications with a computing device (e.g., establish communications with the communications engine 503b of the local computing device 301). Code on the web page loaded in step 1202 may act as the communications engine 504b, such that the mobile device 401 need not be specially configured to communicate with the local computing device 301.

In step 1204, the mobile device may transmit input data from the input devices (e.g., the input devices 402) and to a computing device (e.g., the local computing device 301). The input data may be transmitted via a protocol, such as WebRTC. The input data may be formatted and/or processed, e.g., by the media engine 504a. For example, the communications established in step 1203 may comprise the local computing device 301 transmitting, to the mobile device 401, a request for video in a particular format, and the media engine 504a may encode video from the cameras 403a in the particular format.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   establishing, by a computing device, a connection with a plurality of mobile devices, wherein the plurality of mobile devices are configured to receive input data from a user;
   receiving, by the computing device, the input data from the plurality of mobile devices;
   replicating, based on the input data from the plurality of mobile devices, a physical input device connected to the computing device; and
   using, by the computing device, the replicated physical input device with an application to establish communications between the computing device and a second computing device.

2. The method of claim 1, wherein establishing the connection with the plurality of mobile devices comprises:
   causing display of a barcode corresponding to a web page associated with the computing device, wherein receiving the input data comprises receiving the input data via the web page.

3. The method of claim 2, wherein the barcode comprises a Uniform Resource Locator (URL) associated with the web page.

4. The method of claim 1, further comprising:
   outputting, by the computing device and via one or more output devices connected to the computing device, the input data.

5. The method of claim 1, wherein receiving the input data from the plurality of mobile devices comprises receiving, via one or more web browsers executing on the plurality of mobile devices, the input data.

6. The method of claim 1, wherein receiving the input data comprises receiving a plurality of sets of input data corresponding to a different input device of the plurality of mobile devices.

7. The method of claim 1, wherein the physical input device has a device type that is one or more of: a camera, a microphone, or an accelerometer.

8. An apparatus comprising:
one or more processors; and
memory storing instructions that, when executed by the one or more processors, cause the apparatus to:
establish a connection with a plurality of mobile devices, wherein the plurality of mobile devices are configured to receive input data from a user;
receive the input data from the plurality of mobile devices;
replicate, based on the input data from the plurality of mobile devices, a physical input device connected to the apparatus; and
use the replicated physical input device with an application to establish communications between the apparatus and a computing device.

9. The apparatus of claim 8, wherein the instructions, when executed by the one or more processors, cause the apparatus to establish the connection with the plurality of mobile devices by causing the apparatus to:
cause display of a barcode corresponding to a web page associated with the apparatus, wherein receiving the input data comprises receiving the input data via the web page.

10. The apparatus of claim 9, wherein the barcode comprises a Uniform Resource Locator (URL) associated with the web page.

11. The apparatus of claim 8, wherein the instructions, when executed by the one or more processors, further cause the apparatus to:
output, via one or more output devices, the input data.

12. The apparatus of claim 8, wherein the instructions, when executed by the one or more processors, cause the apparatus to receive the input data from the plurality of mobile devices by causing the apparatus to receive, via one or more web browsers executing on the plurality of mobile devices, the input data.

13. The apparatus of claim 8, wherein the instructions, when executed by the one or more processors, cause the apparatus to receive the input data by causing the apparatus to receive a plurality of sets of input data, each corresponding to a different input device of the plurality of mobile devices.

14. The apparatus of claim 8, wherein the physical input device has a device type that is one or more of: a camera, a microphone, or an accelerometer.

15. A non-transitory computer-readable medium storing instructions that, when executed by a computing device, cause the computing device to:
establish a connection with a plurality of mobile devices, wherein the plurality of mobile devices are configured to receive input data from a user;
receive the input data from the plurality of mobile devices;
replicate, based on the input data from the plurality of mobile devices, a physical input device connected to the computing device; and
use the replicated physical input device with an application to establish communications between the computing device and a second computing device.

16. The non-transitory computer-readable medium of claim 15, wherein the instructions, when executed, cause the computing device to establish the connection with the plurality of mobile devices by causing the computing device to:
cause display of a barcode corresponding to a web page associated with the computing device, wherein receiving the input data comprises receiving the input data via the web page.

17. The non-transitory computer-readable medium of claim 16, wherein the barcode comprises a Uniform Resource Locator (URL) associated with the web page.

18. The non-transitory computer-readable medium of claim 15, wherein the instructions, when executed by the computing device, further cause the computing device to:
output, via one or more output devices, the input data.

19. The non-transitory computer-readable medium of claim 15, wherein the instructions, when executed, cause the computing device to receive the input data from the plurality of mobile devices by causing the computing device to receive, via one or more web browsers executing the plurality of mobile devices, the input data.

20. The non-transitory computer-readable medium of claim 15, wherein the instructions, when executed, cause the computing device to receive the input data by causing the computing device to receive a plurality of sets of input data corresponding to a different input device of the plurality of mobile devices.

* * * * *